(No Model.) 2 Sheets—Sheet 1.

F. R. PATCH.
PLANING OR MOLDING MACHINE.

No. 572,443. Patented Dec. 1, 1896.

Witnesses.
L. C. Hills.
J. B. Keefer.

Inventor:
Fred R. Patch,
Marcellus Bailey
by his Atty.

(No Model.) 2 Sheets—Sheet 2.
F. R. PATCH.
PLANING OR MOLDING MACHINE.
No. 572,443. Patented Dec. 1, 1896.
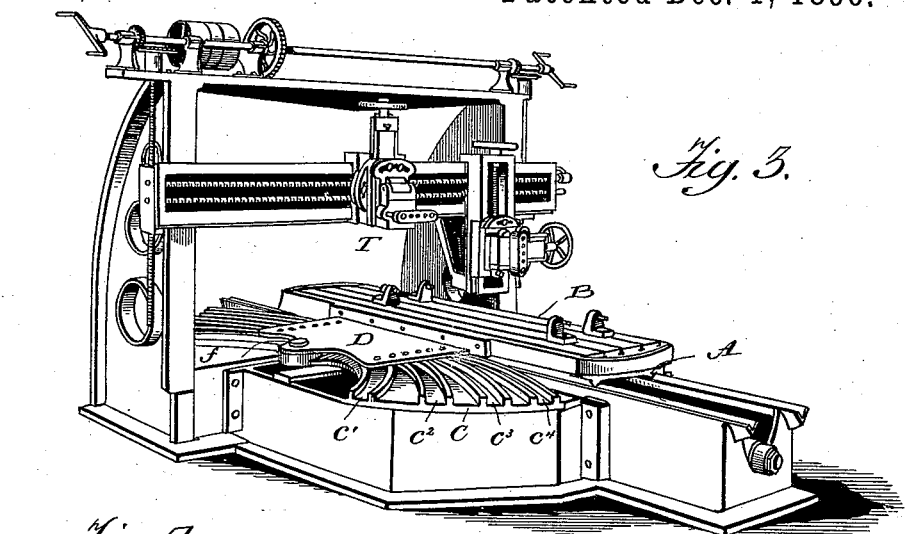
Fig. 3.
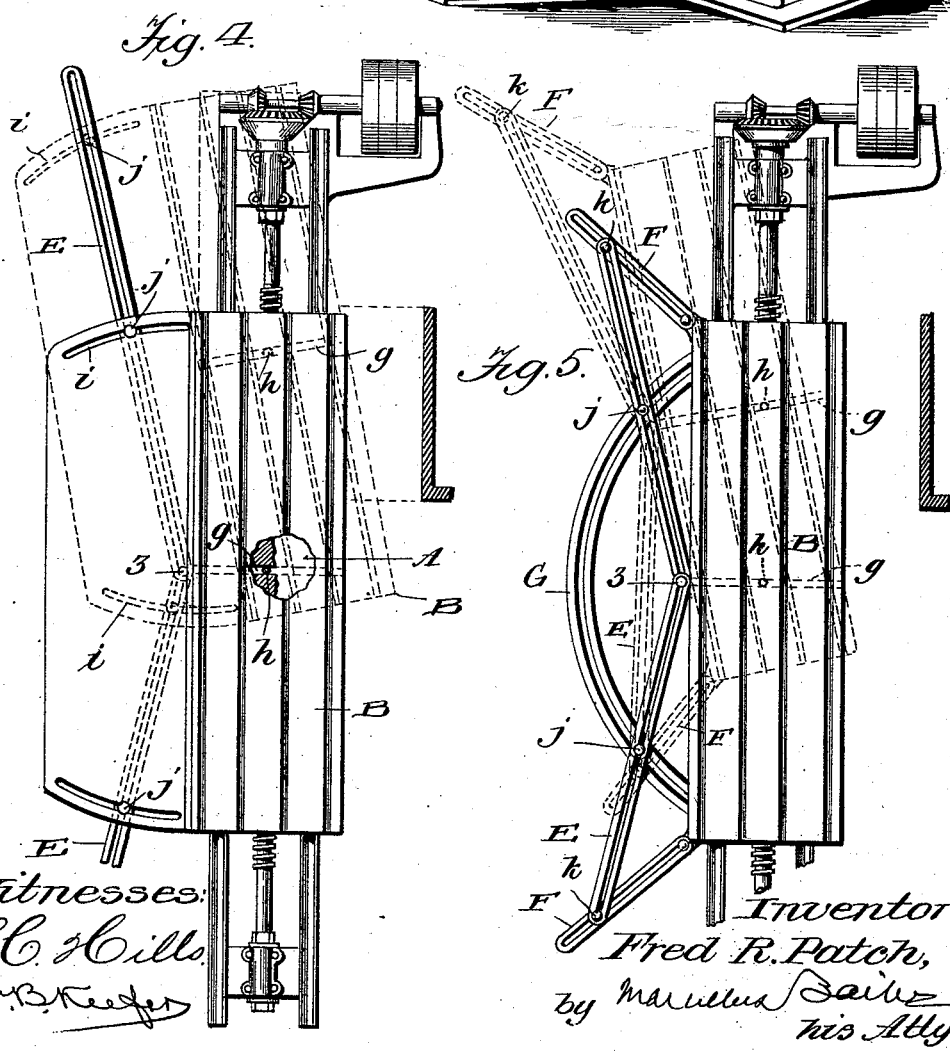
Fig. 4.
Fig. 5.
Witnesses:
L. C. Hill
F. B. Keefer
Inventor:
Fred R. Patch,
by Marcellus Bailey
his Atty.
THE NORRIS PETERS CO., PHOTO-LITHO., WASHINGTON, D. C.

UNITED STATES PATENT OFFICE.

FRED R. PATCH, OF RUTLAND, VERMONT.

PLANING OR MOLDING MACHINE.

SPECIFICATION forming part of Letters Patent No. 572,443, dated December 1, 1896.

Application filed February 24, 1896. Serial No. 580,431. (No model.)

*To all whom it may concern:*

Be it known that I, FRED R. PATCH, of Rutland, in the county of Rutland and State of Vermont, have invented certain new and useful Improvements in Planing or Molding Machines, of which the following is a specification.

My invention is directed to means whereby the work to be operated on can be planed in a circle or on a curve of any radius, as in rounding the corners of stone or metal slabs, or for any other purpose.

To this end I combine with the ordinary reciprocating or longitudinally-moving platen, which I will call the "main" platen, a work-carrying auxiliary platen placed upon and carried by the main platen. The connections between the two are such that while the auxiliary platen is by the main platen caused to move longitudinally when the latter moves, it will at the same time be capable of a lateral bodily movement as well as a swinging or partial rotary movement upon but independent of the main platen. With the two platens thus connected I combine a stationary guide attached to the bed-plate or other part of the framing of the machine and another guide attached to and moving with the auxiliary platen, these guides having a tongue or pin and groove or equivalent connection, whereby when the auxiliary platen is moved by the main platen, which it engages, the tongue or pin device or devices on the one guide will be caused to traverse the groove in the other guide, and thus compel the auxiliary platen to move bodily in a path the curvature of which is determined by the particular conformation of the guide-groove. The pin or tongue and groove connection between the guides is made variable, so that by a proper adjustment and positioning of the points of connection between them the auxiliary platen can be caused to move in the arc of any circle desired. It is in this combination of instrumentalities that my invention mainly is comprised.

To enable those skilled in the art to understand and use my invention, I will now proceed to describe more particularly the manner in which the same is or may be carried into effect by reference to the accompanying drawings, after which I will point out more specifically in the claims those features which I believe to be new and of my own invention.

Figure 1:
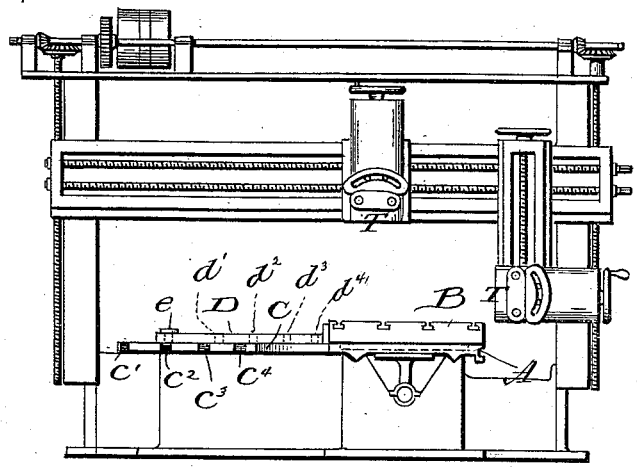
Figure 2:
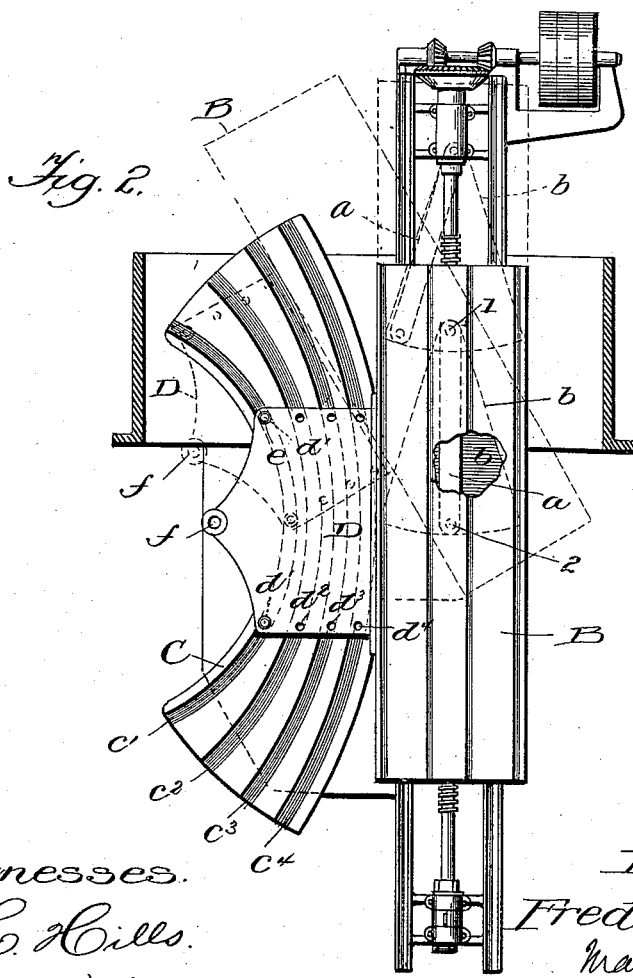

In the drawings, Figure 1 is a front elevation. Fig. 2 is a plan, and Fig. 3 is a perspective view, of a machine embodying my invention. Figs. 4 and 5 are plan views, to some extent diagrammatic, of modifications which will be hereinafter more particularly referred to.

Like letters and figures of reference indicate corresponding parts in all the figures.

The machine itself, except in the particulars hereinafter noted, is of the ordinary type.

A is the usual platen—the one which I term the "main" platen. It is supported and moved in longitudinal V-ways formed in the bed-plate of the machine, and is driven by a worm shaft and gear, as is customary.

Upon the main platen A, I place the auxiliary platen B, and upon this platen is secured the work to be planed.

The two platens in the machine shown in Figs. 1 and 3 are connected together by a connecting-rod $a$, pivoted at one end 1 to the main platen and at the other end to the auxiliary platen. The connecting-rod lies between the two platens and is contained in a recess $b$, formed in one or both of the meeting faces of the platens, which recess is of sufficient dimensions to permit enough swing of the rod on its pivot 1 to allow the auxiliary platen bodily lateral movement to the requisite extent. Under this arrangement it will be noted that the auxiliary platen is capable of three movements—one longitudinal, another lateral, and the third oscillatory upon the pivot 2 as an axis.

Secured to the bed-plate of the machine shown in Figs. 1 and 3 alongside of the platens is a guide, which in this instance has the form of a table C, in the face of which are grooves $c'$ $c^2$ $c^3$ $c^4$. These grooves are arcs of circles of different diameters.

Overhanging the guiding-table C is an apron D, fixed to the side of the auxiliary platen, in which are formed a series of bolt-holes $d'$ $d^2$ $d^3$ $d^4$, located so as to register with the correspondingly-numbered grooves $c'$, &c., in the guiding-table, there being two holes for each groove.

It will be understood that these grooves may be of any suitable form and dimensions. I mount rolls on the ends of the pins which enter the grooves, so as to reduce friction.

When the apparatus is to be used for planing circles, pins or bolts $e$ are inserted in that set of bolt-holes corresponding to the groove having the required radius. For example, the pins are shown as engaging in the bolt-hole $d'$ the groove $c'$ of smallest radius. When under these circumstances the main platen A travels forward, the auxiliary platen B (on which the work is held) moves with it, but in so moving is, by the engagement of the pins or bolts $e$ with the groove $c'$, caused to swing gradually to a position in which it stands diagonally across the lower platen, as indicated by dotted lines in Fig. 2. In thus moving it has been caused to carry the work upon it in a circular path tangential to the tool T, which latter operates upon the curved edge of that work, just as it would operate upon the straight edge of a block or slab held upon a platen moving in a right line. In this way, and by varying the position of the tool T upon its supporting-head, circles of varying diameters can be planed—as, for example, I can, by properly adjusting the tool upon the cross-head, plane circles of from four feet to seven feet six inches in diameter, using the same circular groove.

For diameters less than four feet I can use a pin which will pass down through the hole $f$ in the apron into a pivot-hole in the guide-table C, the pin being the axis on which the upper platen will swing.

Manifestly the grooves may be formed in the apron D and the pins can be carried by the table C, this being a mere reversal of the arrangement described. I may also use detachable ribs or tongues in lieu of the pins to enter the grooves.

In lieu of using the swinging connecting-rod $a$ I may connect the two platens in other ways, so as to permit the auxiliary platen bodily lateral movement and oscillatory movement upon an axis independently of the main platen, of whose longitudinal movement it partakes. This result, for example, can be obtained by providing the meeting faces of the two platens the one with a cross-groove, the other with a pin to enter that groove. The cross-groove allows bodily lateral movement of the auxiliary platen, while the pin forms the axis upon which said platen can oscillate. Such an arrangement is shown in Fig. 4. In this figure the cross-slot $g$ is formed in the upper platen, and the pin $h$, which enters that slot, is secured to the lower platen. In this figure the variable connections between the two guides requisite in order to permit the planing of circles of different diameters is obtained not by a series of grooves, as in Figs. 1 and 3, but by making one groove itself variable. This result is attained by the employment as one of the guides of two longitudinally-slotted arms E, pivoted together at 3, these arms being in the present instance secured to the bed-plate of the machine. The other guide is in the form of an apron F, attached to the auxiliary platen B and overhanging the guide-arms E. At each end of the apron is a slot $i$, which extends crosswise of the apron, and in each slot is a pin or bolt $j$, which can be adjusted lengthwise of its slot and then secured in its adjusted position. One pin enters the slot in one arm E and the other pin enters the slot in the other arm.

The arms E are first set at that angle to each other which will cause the auxiliary platen to move in the desired circular path, and are secured firmly in that position by suitable means, and then the bolts $j$ are set down into place and secured in that position.

When the main platen moves forward, the auxiliary platen moves with it, but by the connection of the two guides it is caused to travel in a circular path, the pins $j$ during this movement traversing the slotted arms E, and the angle at which the latter are adjusted to each other determines the diameter of the circle on which the auxiliary platen moves. Thus by means of the adjustable arms E, I obtain the same capacity for varying the path of the auxiliary platen that is possible by the series of guide-grooves in Figs. 1 and 3.

In the plan illustrated in Fig. 4 the pivoted variable or adjustable guide-arms E are attached to the bed-plate of the machine, but they can just as well be attached to the auxiliary platen. This modification is illustrated in Fig. 5, where the slotted arms E are pivoted at the point 3 to the auxiliary platen B and are held in their adjusted position by longitudinally-slotted pivoted stay-bars F and bolts $k$, which pass through the bars F and arms E at their points of intersection and bind them together. The stationary guide is shown at G as a longitudinally-slotted curved guide-bar attached to the bed-plate of the machine. The pins $j$ (with rollers on their protruding ends, as hereinbefore provided) are secured in the slotted bar at the points where the latter is intersected by the arms E, and they project up into the slots in said arms.

It will be noticed that my invention is readily applicable to existing machines, all that is needed being to add to the latter the two guides and their connections and the auxiliary platen. It will also be noted that when the two guides are disengaged the machine can be used as an ordinary planing-machine.

Having now described my invention, and the manner in which the same is or may be carried into effect, I state in conclusion that I do not limit myself to the structural details hereinbefore described, for manifestly the same can be considerably varied by the skilled mechanic without departure from the spirit of my invention; but

What I believe to be new, and desire to secure by Letters Patent, is as follows:

1. The combination of the main platen, the auxiliary platen carried by the same, connections between the two whereby the auxiliary platen while moving with the main platen is permitted bodily lateral and oscillatory movement independent of the latter, guides attached to the auxiliary platen and stationary part of the machine respectively and adjustable with reference to each other for the purpose of varying the path of movement of the auxiliary platen, and connections between said guides whereby the auxiliary platen as it moves along with the main platen has imparted to it a combined bodily lateral and partially rotary movement independent of the latter, substantially as and for the purposes hereinbefore set forth.

2. The combination with the main and auxiliary platens connected together substantially as described, of the two guides attached to the frame of the machine and the auxiliary platen respectively and consisting the one of a guide-table having a series of grooves of varying diameter, and the other an apron carrying pins or their specified equivalents adjustable to engage any one of said grooves substantially as and for the purposes hereinbefore set forth.

In testimony whereof I have hereunto set my hand this 20th day of February, 1896.

FRED R. PATCH.

Witnesses:
WM. LA BOMBARD,
FRED. C. SPENCER.